(12) United States Patent
Ii

(10) Patent No.: US 9,749,483 B2
(45) Date of Patent: Aug. 29, 2017

(54) IMAGE FORMING APPARATUS AND METHOD FOR DISPLAYING TEMPLATE IN IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Motoki Ii, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/940,219

(22) Filed: Nov. 13, 2015

(65) Prior Publication Data

US 2017/0142267 A1    May 18, 2017

(51) Int. Cl.
*H04N 1/00* (2006.01)
*G06F 17/30* (2006.01)
*G06Q 10/06* (2012.01)
*G06K 9/00* (2006.01)

(52) U.S. Cl.
CPC ... *H04N 1/00389* (2013.01); *G06F 17/30716* (2013.01); *G06K 9/00469* (2013.01); *G06Q 10/067* (2013.01); *H04N 1/00424* (2013.01); *G06K 2209/01* (2013.01)

(58) Field of Classification Search
CPC .......... H04N 1/00389; H04N 1/00424; G06K 9/00469; G06F 17/30424; G06F 17/30598; G06F 17/30398
USPC ................. 358/1.9, 1.18, 538, 1.15; 399/81; 707/661, 769, 779, 771; 715/762
See application file for complete search history.

(56) References Cited

U.S. PATENT DOCUMENTS

| | | | |
|---|---|---|---|
| 6,189,003 B1 * | 2/2001 | Leal | G06Q 30/02 |
| 7,492,949 B1 * | 2/2009 | Jamieson | G06F 17/248 |
| | | | 382/217 |
| 2009/0019064 A1 | 1/2009 | Takafuji | |
| 2011/0002014 A1 * | 1/2011 | Tani | H04N 1/00244 |
| | | | 358/403 |
| 2012/0023451 A1 * | 1/2012 | Kuroyanagi | G06F 8/38 |
| | | | 715/835 |

* cited by examiner

*Primary Examiner* — Jamares Q Washington
(74) *Attorney, Agent, or Firm* — Amin, Turocy & Watson LLP

(57) ABSTRACT

According to an image forming apparatus of one embodiment, a business-type-based word database classifies and stores words for each business type. A business-type-based template database stores business-type-based templates in which plural icons to respectively invoke plural functions previously set for each business type are grouped. A word extraction unit extracts a word by analyzing character information included in print data. A coincidence number count unit compares the extracted word with the words stored in the business-type-based word database, and counts a coincidence number in a comparison result for each business type. A business type determination unit determines a business type of a user transmitting the print data based on the coincidence number. A template acquisition unit acquires a template relating to the determined business type of the user from the business-type-based template database. A display unit displays the acquired template on a screen.

10 Claims, 7 Drawing Sheets

US 9,749,483 B2

IMAGE FORMING APPARATUS AND METHOD FOR DISPLAYING TEMPLATE IN IMAGE FORMING APPARATUS

FIELD

Embodiments described herein relate generally to an image forming apparatus and a method for displaying a template in the image forming apparatus.

BACKGROUND

In recent years, an image forming apparatus is known which has a template customizing function in which a frequently used and complicated function setting is previously registered as an icon in a control panel and a menu can be easily invoked by one button. For example, plural operations such as "white and black copy, both-side printing, 2 in 1, stapler upper left oblique binding" are combined and can be registered as one icon. Besides, an image forming apparatus is also known in which the design of an icon can be freely selected. However, the registration operation of the icon and the icon design must be performed by the user himself/herself, and labor is required for the registration operation.

DETAILED DESCRIPTION

In general, according to an image forming apparatus of one embodiment, a business-type-based word database classifies and stores words for each business type. A business-type-based template database stores business-type-based templates in which plural icons to respectively invoke plural functions previously set for each business type are grouped. A word extraction unit extracts a word by analyzing character information included in print data. A coincidence number count unit compares the extracted word with the words stored in the business-type-based word database and counts a coincidence number in a comparison result for each business type. A business type determination unit determines a business type of a user based on the coincidence number.

A template acquisition unit acquires a template relating to the determined business type from the business-type-based template database. A display unit displays the acquired template on a screen.

Figure 1:
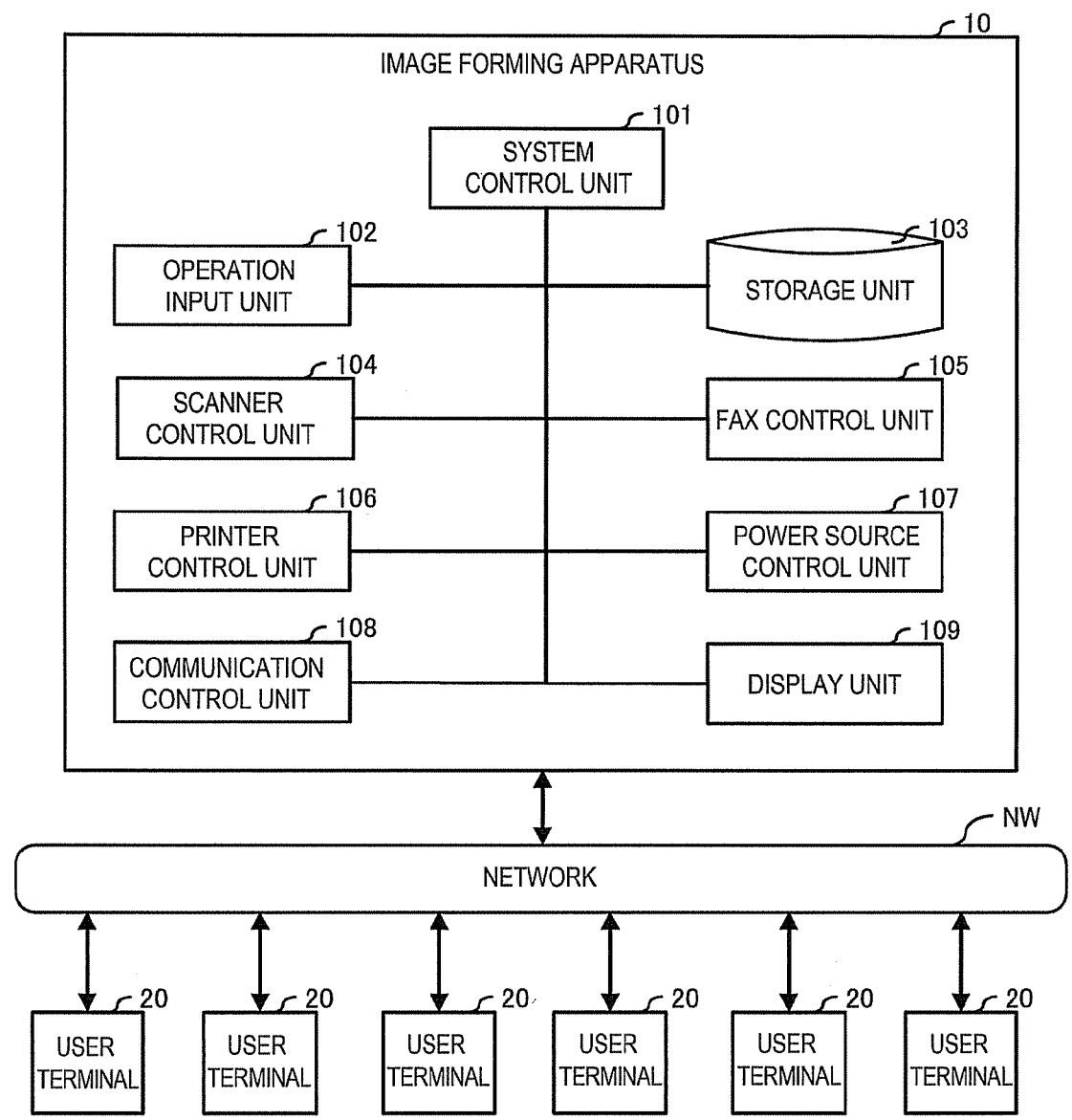
FIG. 1 is a whole structural view showing an example of an image forming apparatus according to an embodiment.

FIG. 1 is a whole structural view showing an example of an image forming apparatus according to an embodiment.

As shown in the drawing, an image forming apparatus 10 is connected to plural user terminals 20 through a network NW such as a LAN, and is configured to be able to receive print data from the user terminals 20. The print data is PDL (Page Description Language) data including position information of characters and figures, format information and the like. Incidentally, the image forming apparatus 10 may be directly connected to the user terminal 20 through a USB cable, not through the network NW.

Besides, the image forming apparatus 10 includes a system control unit 101, an operation input unit 102, a storage unit 103, a scanner control unit 104, a fax control unit 105, a printer control unit 106, a power source control unit 107, a communication control unit 108 and a display unit 109.

The system control unit 101 is a main program to control the whole image forming apparatus 10. The system control unit 101 has a function to convert the print data transmitted from the user terminal 20 into a raster image (bitmap image). The print data converted into the raster image is outputted to the printer control unit 106, and a printing process is performed. The other functions of the system control unit 101 will be described later.

The operation input unit 102 is a device used by the user to input an operation command and the like to the image forming apparatus 10. For example, a software key of a touch panel, a numeric keypad and the like fall within the scope.

The storage unit 103 is a device to store an environmental setting file for controlling the operation of the image forming apparatus 10, a program, processing data generated by the program and the like. For example, a storage device such as a ROM, a RAM or a HDD falls within the scope. Each program (for example, the system control unit 101) is expanded on the RAM by an instruction of a CPU and is executed.

The scanner control unit 104 is a program to control document reading in a scanner device (illustration is omitted). The fax control unit 105 is a program to control transmission and reception of document data in a fax device (illustration is omitted).

The printer control unit 106 is a program to control an image formation unit (illustration is omitted) based on the raster data outputted from the system control unit 101.

The power source control unit 107 is a program to control power supply to each of plural equipments constituting the image forming apparatus 10. The communication control unit 108 is a program to control data communication between the image forming apparatus 10 and the user terminal 20.

The display unit 109 is a display device, such as a liquid crystal display to display an operation screen of the image forming apparatus 10. The display unit 109 and the operation input unit 102 can be integrally provided as hardware. The user depresses a touch panel or a key, and operates the image forming apparatus 10.

Figure 2:
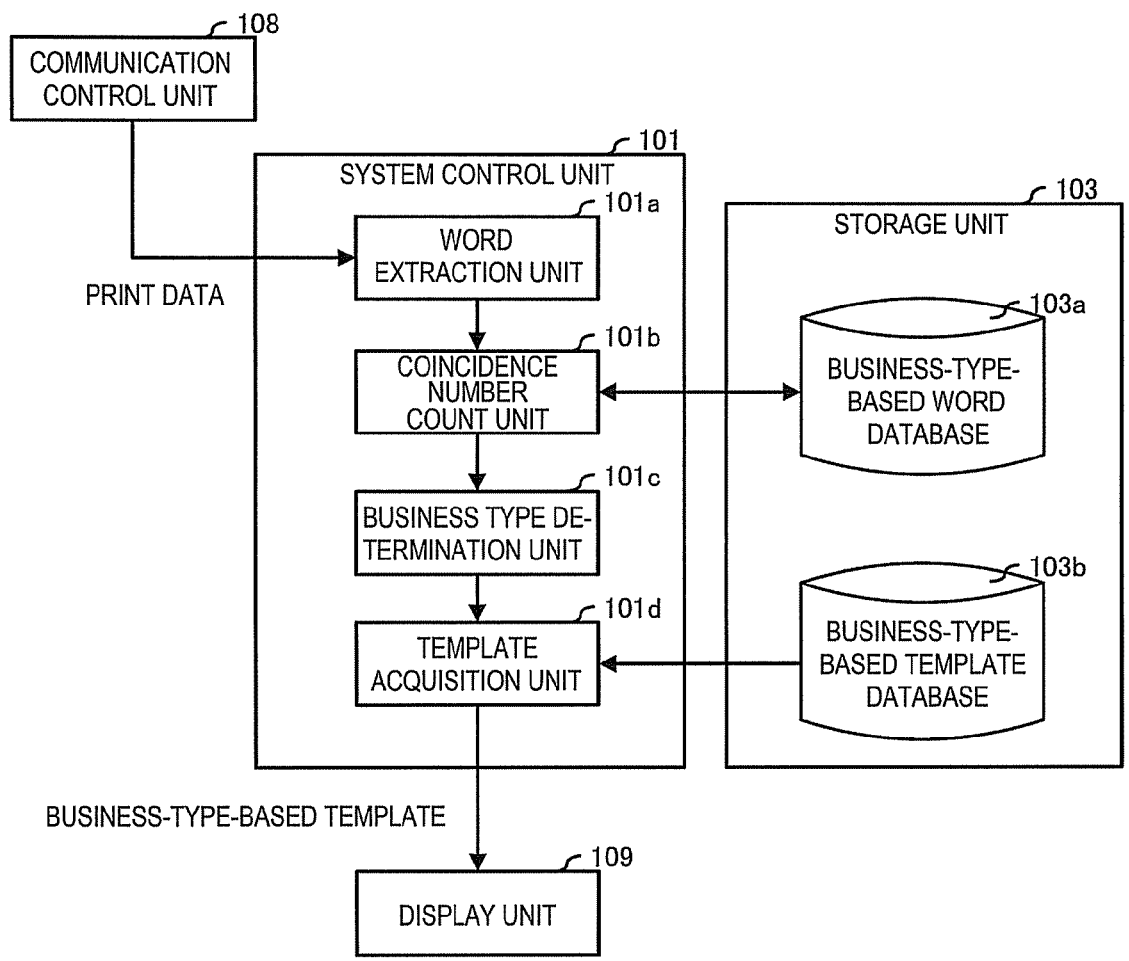
FIG. 2 is a block diagram showing an example of a system control unit and a storage unit.

FIG. 2 is a block diagram showing an example of the system control unit 101 and the storage unit 103. Here, the system control unit 101 includes a word extraction unit 101a, a coincidence number count unit 101b, a business type determination unit 101c, and a template acquisition unit 101d. Incidentally, the conversion function of the print data is omitted in the drawing.

The storage unit 103 includes a business-type-based word database 103a and a business-type-based template database 103b. The business-type-based word database 103a classifies and stores words for each business type. That is, words frequently used in a specific business type and intrinsic words are previously stored.

The business-type-based template database 103b stores business-type-based templates in which plural icons to respectively invoke plural functions previously set for each business type are grouped.

The word extraction unit 101a extracts a word by analyzing character information included in the print data.

The coincidence number count unit 101b compares the word extracted in the word extraction unit 101a with the words stored in the business-type-based word database 103a, and counts a coincidence number in a comparison result for each business type.

Figure 3:
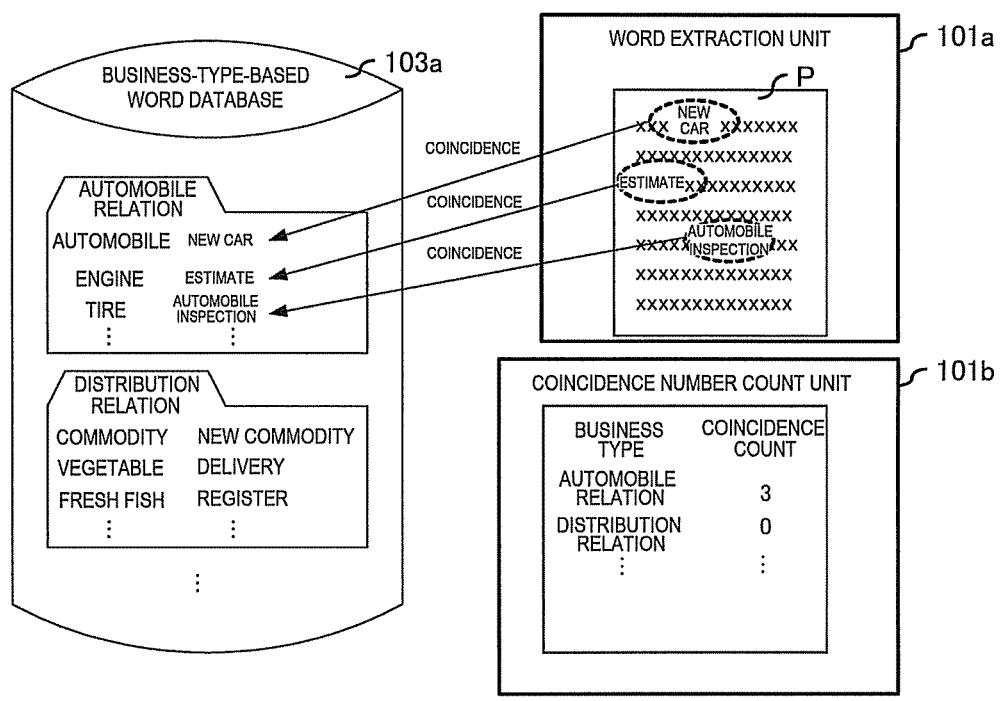
FIG. 3 is a view for explaining a process of comparing a word extracted from print data with words of a business-type-based word database.

FIG. 3 is a view for explaining a process of comparing a word extracted from print data with words of the business-type-based word database 103a. Here, an example is described in which the word extraction unit 101a extracts three words of "new car", "estimate" and "automobile inspection" as words included in print data P, and compares and collates these words with the words in the business-type-based word database 103a. Since the words extracted from the print data P are respectively coincident with words of {business type: automobile relation}, the coincidence number count unit 101b determines that the coincidence number (coincidence count) of the automobile relation is 3. On the other hand, the coincidence number with respect to words of {business type: distribution relation} is 0.

The business type determination unit 101c determines the business type of the user based on the coincidence number outputted from the coincidence number count unit 101b. In the embodiment, the business type in which the coincidence number is largest is determined to be the business type of the user. For example, in the case of the example of FIG. 3, the business type is determined to be the automobile relation.

The template acquisition unit 101d acquires a template relating to the business type determined by the business type determination unit 101c from the business-type-based template database 103b, and outputs the template to the display unit 109.

Figure 4:
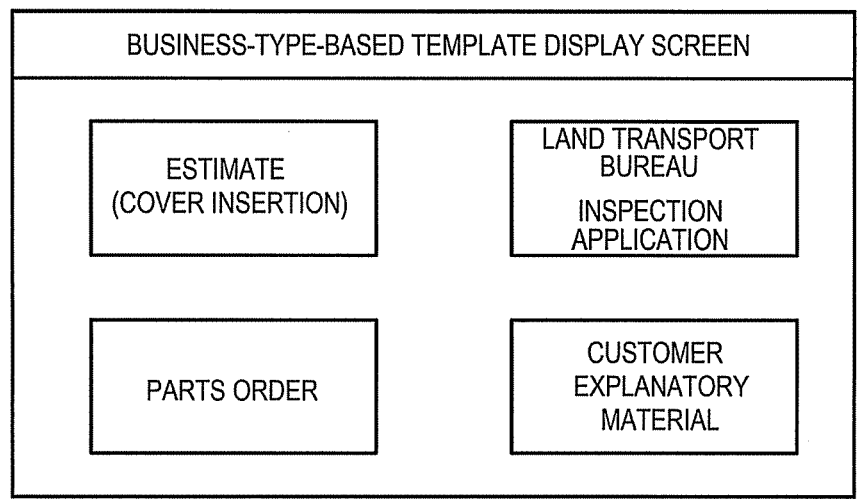
FIG. 4 is a view showing an example of a business-type-based template display screen.

FIG. 4 is a view showing an example of a business-type-based template display screen. Here, a template including four icons of "estimate (cover insertion)", "Land Transport Bureau inspection application", "parts order" and "customer explanatory material" is displayed as the template of the automobile relation on the screen. The user selects a desired icon from these icons.

Figure 5:
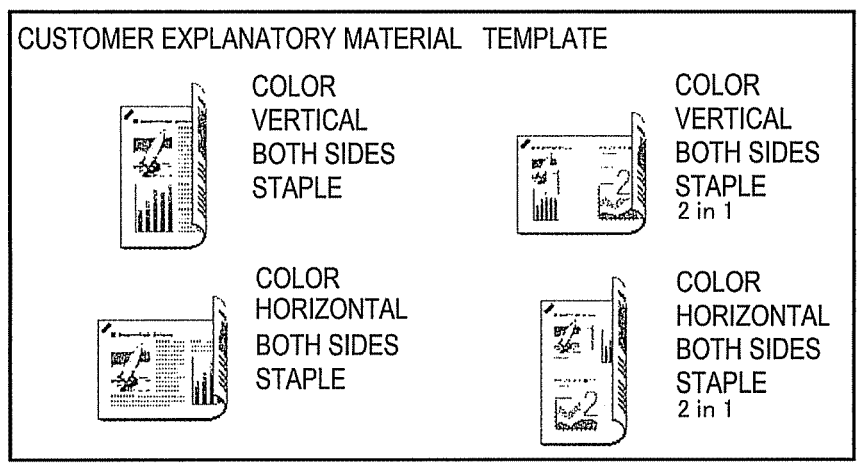
FIG. 5 is a view showing an example of a business-type-based template detail screen.

FIG. 5 is a view showing an example of a business-type-based template detail screen. Here, another template displayed when the user selects the icon of "customer explanatory material" on the screen of FIG. 4 is displayed on the screen. A combination of plural operation settings of the image forming apparatus 10 is correlated with each icon. For example, when the upper left icon is selected, the print setting of {print color: color, print direction: vertical, print surface: both sides, staple: yes} can be easily registered.

Hereinafter, the operation of the image forming apparatus constructed as described above will be described.

Figure 6:
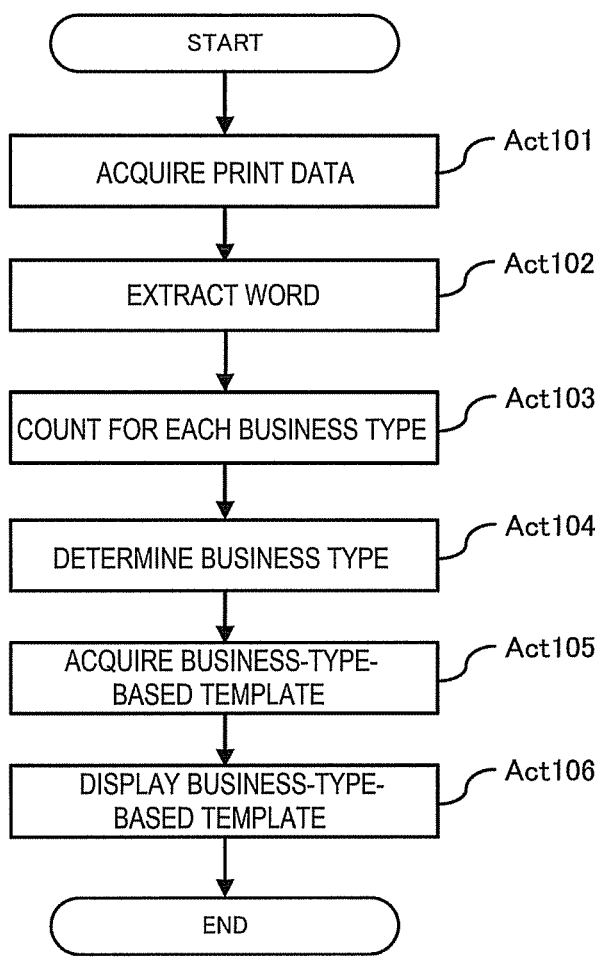
FIG. 6 is a flowchart showing an example of a template display process of the image forming apparatus according to the embodiment.

FIG. 6 is a flowchart showing an example of a template display process of the image forming apparatus 10 according to the embodiment.

First, the word extraction unit 101a acquires print data transmitted by the user through the network NW from the communication control unit 108 (Act101).

Next, the word extraction unit 101a extracts a word by analyzing character information included in the print data acquired at Act101 (Act102).

Next, the coincidence number count part 101b compares the word extracts at Act102 with words in the business-type-based word database 103a, and counts a coincidence number in the comparison result for each business type (Act103).

Next, the business type determination unit 101c determines the business type of the user transmitting the print data based on the coincidence number for each business type counted at Act103 (Act104).

Next, the template acquisition unit 101d uses the business type determined at Act104 as a key and acquires a template relating to the business type of the user from the business-type-based template database 103b (Act105).

The template acquisition unit 101d displays the template acquired at Act105 on the screen (Act106) and ends the process.

As described above, according to the image forming apparatus of the embodiment, the user merely transmits the print data to the image forming apparatus, and the template icons with high usage frequency can be automatically displayed on the screen. As a result, the operation load of the user himself/herself to previously register a template icon can be reduced.

Subsequently, modified examples of the embodiment will be described.

Figure 7:
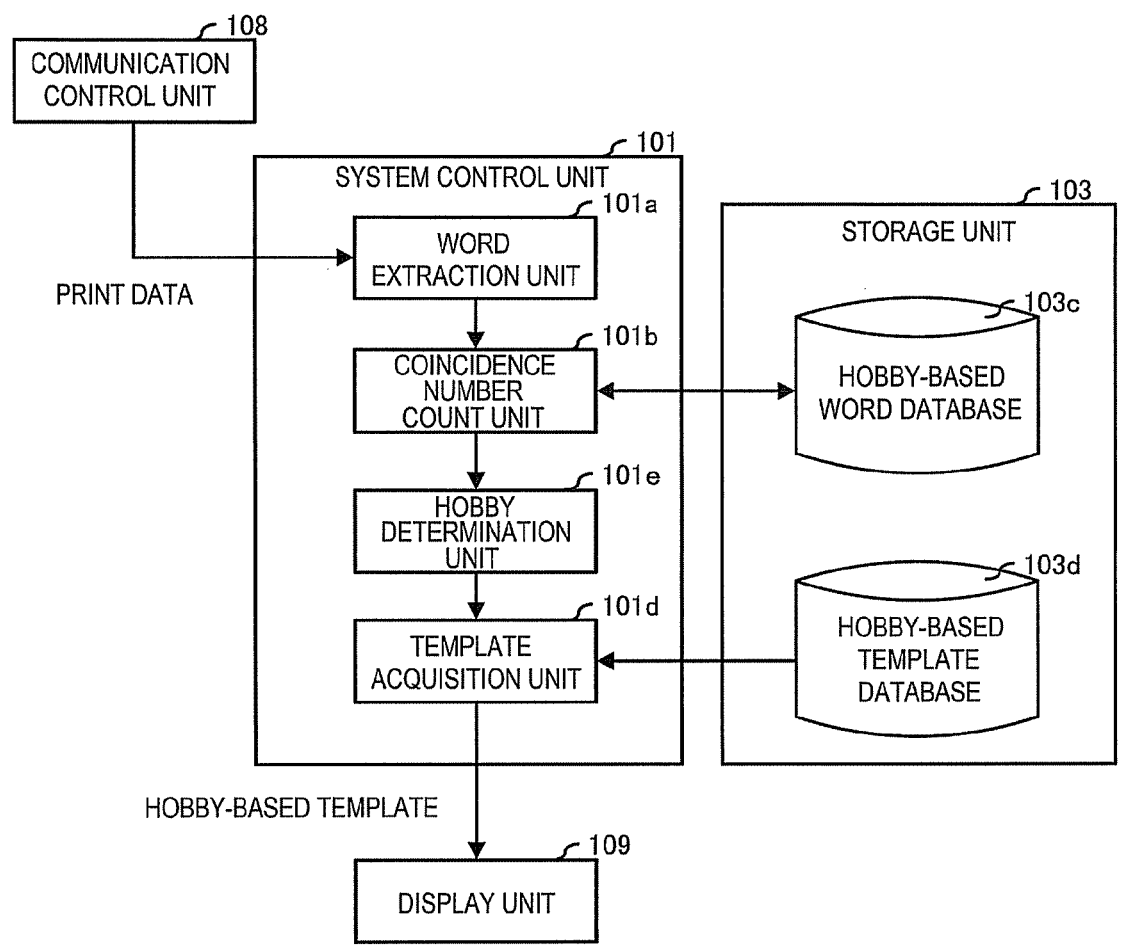
FIG. 7 is a block diagram showing a system control unit and a storage unit in a modified example of the image forming apparatus according to the embodiment.

Although the word database is defined for each business type in the embodiment, classification may be performed in categories other than the business type. FIG. 7 is a block diagram showing an example of a system control unit in a modified example of the image forming apparatus 10 according to the embodiment. Here, a storage unit 103 includes a hobby-based word database 103c and a hobby-based template database 103d. A system control unit 101 includes a hobby determination unit 101e. The hobby-based word database 103c classifies and stores words for each hobby. The hobby-based template database 103d stores a hobby-based template in which plural icons to respectively invoke plural functions previously set for each hobby are grouped. In this case, a coincidence number count unit 101b compares a word extracted by a word extraction unit 101a with the words stored in the hobby-based word database 103c, and counts a coincidence number in a comparison result for each hobby. The hobby determination unit 101e determines the hobby of the user transmitting the print data based on the coincidence number.

Figure 8:
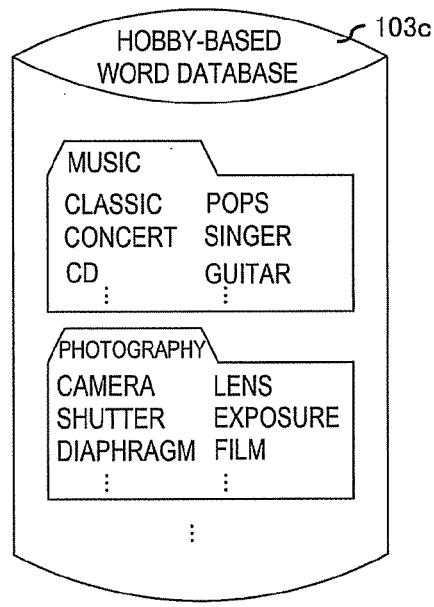
FIG. 8 is a view showing an example of a hobby-based word database.

FIG. 8 is a view showing an example of the hobby-based word database. Here, hobbies include "music" and "photography". The hobby of "music" is correlated with words such as "classic", "pops" and "concert".

Figure 9:
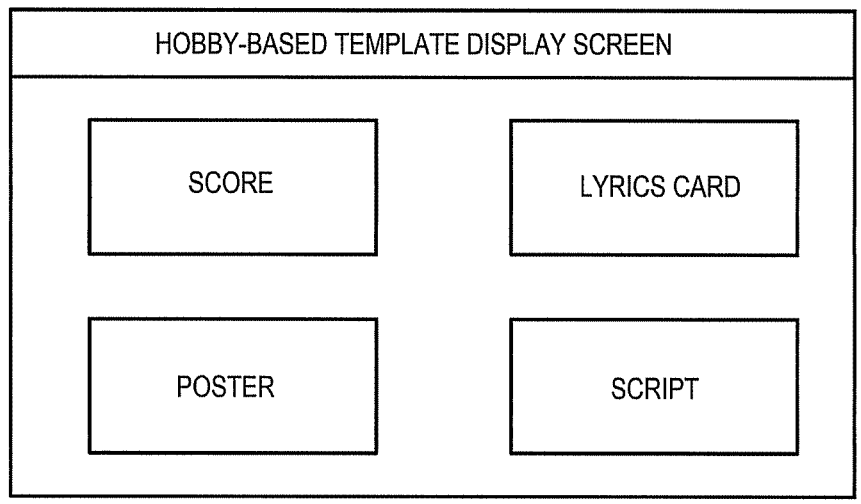
FIG. 9 is a view showing an example of a hobby-based template display screen.

FIG. 9 is a view showing an example of a hobby-based template display screen. Here, as the hobby-based template corresponding to "music", the template including four icons of "score", "lyrics card", "poster" and "script" is displayed on the screen.

Figure 10:
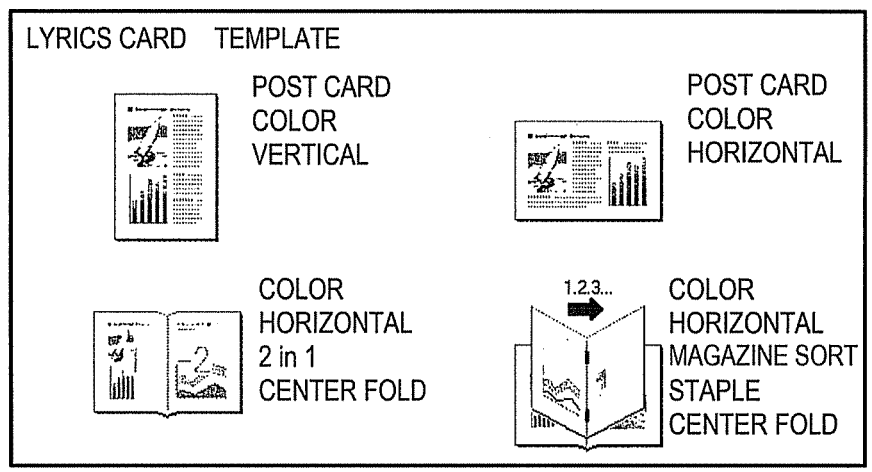
FIG. 10 is a view showing an example of a bobby-based template detail screen.

FIG. 10 is a view showing an example of a hobby-based template detail screen. Here, another template displayed when the user selects the icon of "lyrics card" on the screen of FIG. 9 is displayed. Each icon is correlated with a combination of plural operation settings of the image forming apparatus 10. For example, when the upper left icon is selected, the print setting of {sheet size: post card, print color: color, print direction: vertical} can be easily registered.

Besides, the coincidence number count control may not be performed only in one print job, and the business type may be determined based on a count number (coincidence number) in a specified statistical period of the same user. As the cumulative job number increases, the accuracy of determining the business type of the user can be improved.

Similarly, a business type of a user group, not a user, to which a user belongs may be determined based on a count number (coincidence number) in a specified statistical period of the user group.

Besides, the process of comparing and collating the extracted word with the words in the database and the count control process may be performed after the end of the print control and at the time of standby of the image forming apparatus 10. In this case, the load of the CPU of the image forming apparatus 10 is suppressed, and reduction in performance at the time of normal use can be suppressed.

Besides, since the closeness degree between a business type and each word is not constant, the business-type-based word database 103a may be configured such that a correspondence relation among a business type, a word and a weighting value of the word is stored. In this case, the business type determination unit 101c calculates (for example, multiples) a coincidence degree of a word for respective business types based on a word count number and the weighting value, and determines the business type of the user by comparing the calculated values. Even when the coincidence number is the same, the business type can be determined.

Further, a word can be extracted by character analysis of data other than the print data. For example, scan data may be used instead of the print data.

What is claimed is:

1. An image forming apparatus comprising:
    a memory configured to store computer-executable instructions; and
    a processor configured to execute the computer-executable instructions to perform operations comprising:
    receiving print data from a user terminal, wherein the print data is page description language data;
    classifying and storing words for each business type in a business-type based word database;
    storing business-type-based templates in a business-type based template database in which a plurality of icons to respectively invoke a plurality of functions previously set for each business type are grouped;
    extracting a word from the print data by analyzing character information included in the print data;
    comparing the extracted word with the words stored in the business-type-based word database and to count a coincidence number in a comparison result for each business type;
    determining a business type of a user transmitting the print data based on the coincidence number;
    acquiring a template relating to the determined business type of the user from the business-type-based template database;
    displaying the acquired template on a screen; and
    converting the print data to a raster image based on the acquired template being selected based on user input.

2. The apparatus according to claim 1, wherein the operations further comprise
    performing the count for the user, and
    determining the business type of the user based on a coincidence number in a specified statistical period of the user.

3. The apparatus according to claim 1, wherein
    performing the count for a user group to which the user belongs, and
    determining a business type of the user group based on a coincidence number in a specified statistical period of the user group.

4. The apparatus according to claim 1, wherein
    storing a correlation relation among the business type, the word, and a weighting value of the word, and
    determining the business type of the user by calculating a coincidence degree of the word for the business type based on a count number of the word and the weighting value.

5. The apparatus according to claim 1, wherein the operations further comprise:
    analyzing scan data outputted from a scanner and extracting a word.

6. A method for displaying a template in an image forming apparatus, comprising:
    extracting, by the image forming apparatus comprising a processor, a word by analyzing character information included in print data;
    counting, by the image forming apparatus, a coincidence number in a comparison result for each business type by comparing the extracted word with words in a business-type-based word database in which the words are classified for each business type and are stored;
    determining, by the image forming apparatus, a business type of a user transmitting the print data based on the coincidence number;
    acquiring, by the image forming apparatus, a template relating to the business type of the user by using the determined business type as a key from a business-type-based template database storing business-type-based templates in which a plurality of icons to respectively invoke a plurality of functions previously set for each business type are grouped;
    displaying, by the image forming apparatus, the acquired template on a screen;
    receiving, by the image forming apparatus user input indicative of a selection of the acquired template; and
    displaying, by the image forming apparatus, a raster image of the print data based on the acquired template.

7. The method according to claim 6, wherein
    in the counting the coincidence number, the count is performed for the user, and
    in the determining the business type, the business type of the user is determined based on a coincidence number in a specified statistical period of the user.

8. The method according to claim 6, wherein
    in the counting the coincidence number, the count is performed for each user group to which the user belongs, and
    in the determining the business type, a business type of the user group is determined based on a coincidence number in a specified statistical period of the user group.

9. The method according to claim 6, wherein
    when the business-type-based word database stores a correlation relation among the business type, the word and a weighting value of the word,
    in the determining the business type, a coincidence degree of the word is calculated for each business type based on a count number of the word and the weighting value, and the business type of the user is determined.

10. The method according to claim 6, further comprising: extracting, by the image forming apparatus, the word by analyzing scan data outputted from a scanner.

\* \* \* \* \*